United States Patent
Tada et al.

(10) Patent No.: US 8,155,591 B2
(45) Date of Patent: Apr. 10, 2012

(54) ELECTRONIC COMMUNICATION METHOD, ELECTRONIC COMMUNICATION SYSTEM, COMMUNICATION TERMINAL, AND SERVER

(75) Inventors: Koji Tada, Tokyo (JP); Naoya Sato, Tokyo (JP); Yukihito Morikawa, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1009 days.

(21) Appl. No.: 12/065,317

(22) PCT Filed: Jul. 20, 2006

(86) PCT No.: PCT/JP2006/314386
§ 371 (c)(1),
(2), (4) Date: May 6, 2008

(87) PCT Pub. No.: WO2007/043232
PCT Pub. Date: Apr. 19, 2007

(65) Prior Publication Data
US 2009/0227206 A1     Sep. 10, 2009

(30) Foreign Application Priority Data
Oct. 7, 2005   (JP) .................................. 2005-295791

(51) Int. Cl.
*H04B 7/00*   (2006.01)
(52) U.S. Cl. ........ 455/41.2; 455/518; 455/519; 455/415
(58) Field of Classification Search .................. 455/410, 455/411, 415, 435.1, 455, 551, 41.2, 517–520, 455/553.1, 90.2, 78, 500, 426.1; 379/189
See application file for complete search history.

(56) References Cited

U.S. PATENT DOCUMENTS 7,209,653 B2 *   4/2007   Umeda .......................... 396/661
7,447,784 B2 *   11/2008   Eun ................................ 709/229
(Continued)

FOREIGN PATENT DOCUMENTS

JP        2002-27037        1/2002
(Continued)

OTHER PUBLICATIONS

Notification of Reason(s) for Refusal dated Jul. 20, 2010, from the corresponding Japanese Application.

(Continued)

*Primary Examiner* — Dominic E Rego
(74) *Attorney, Agent, or Firm* — Katten Muchin Rosenman LLP

(57) ABSTRACT

A user information management unit of a terminal generates a management number for respective users. A terminal to terminal communication unit communicates with another terminal through ad hoc communication, acquires a unique user ID set for the other user, and stores the user ID in a friend information storing unit. The data generated in a data generation unit is transmitted to a server from a sending unit along with a destination user ID selected from user IDs stored in a friend information storing unit. A reception unit in the server stores the transmitted data in a data storing unit for each destination user ID. When the server receives a connection request from a terminal, a connecting user information acquisition unit in the server identifies a user ID of a connection origin and a data retrieving unit transmits the data to the terminal by retrieving a data storing unit based on the user ID, indicating the user requested for the connection as a destination.

16 Claims, 10 Drawing Sheets

U.S. PATENT DOCUMENTS

| | | | |
|---|---|---|---|
| 2002/0046083 A1* | 4/2002 | Ondeck | 705/14 |
| 2002/0086730 A1 | 7/2002 | Nakai | |
| 2003/0007640 A1* | 1/2003 | Harada et al. | 380/270 |
| 2003/0139910 A1* | 7/2003 | Yamamoto et al. | 702/188 |
| 2004/0156487 A1* | 8/2004 | Ushiki et al. | 379/88.22 |
| 2004/0224774 A1 | 11/2004 | Nakai | |
| 2004/0240393 A1* | 12/2004 | Nishida et al. | 370/253 |
| 2005/0144044 A1* | 6/2005 | Godschall et al. | 705/3 |
| 2005/0273399 A1* | 12/2005 | Soma et al. | 705/26 |
| 2005/0281393 A1* | 12/2005 | Kubo et al. | 379/88.01 |
| 2006/0088042 A1* | 4/2006 | Shoham et al. | 370/401 |
| 2007/0143397 A1* | 6/2007 | Guedalia et al. | 709/203 |
| 2007/0177740 A1* | 8/2007 | Nakajima | 380/277 |
| 2009/0019061 A1* | 1/2009 | Scannell, Jr. | 707/10 |
| 2009/0303909 A1* | 12/2009 | Farhoudi et al. | 370/312 |

FOREIGN PATENT DOCUMENTS

| | | |
|---|---|---|
| JP | 2002-52253 | 2/2002 |
| JP | 2002-253865 | 9/2002 |
| JP | 2004-13591 | 1/2004 |
| JP | 2005-182169 | 7/2005 |
| JP | 2005-211232 | 8/2005 |

OTHER PUBLICATIONS

International Search Report dated Oct. 24, 2006, from the corresponding International Application.

International Preliminary Report on Patentability dated Apr. 9, 2008, from the corresponding International Application.

Notification of Reason(s) for Refusal dated Oct. 12, 2010, from the corresponding Japanese Application.

Decision of Refusal and Decision to Dismiss the Amendment dated Jan. 4, 2011, from the corresponding Japanese Application.

* cited by examiner

FIG.3

| USER NAME | MANAGEMENT NUMBER |
|---|---|
| SUZUKI | 182 |
| KYOKO | 273 |
| midori | 722 |
| ... | ... |

72 (USER NAME column), 74 (MANAGEMENT NUMBER column), 70 (table)

FIG.5

| DESTINATION ID | STORED ADDRESS |
|---|---|
| 182.376 | 0x003456 |
| 154.722 | 0x008652 |
| 100.948 | 0x02EF75 |
| 455.356 | 0x1209FF |
| ... | ... |

92 — DESTINATION ID column
94 — STORED ADDRESS column
90

ELECTRONIC COMMUNICATION METHOD, ELECTRONIC COMMUNICATION SYSTEM, COMMUNICATION TERMINAL, AND SERVER

BACKGROUND OF THE INVENTION

1. Field of the Invention

The present invention relates to electronic communication technologies. In particular, the invention relates to electronic communication methods which include communications with or without base stations, and electronic communication systems, communication terminals, and servers to which the electronic communication methods are applied.

2. Description of the Related Art

As the function of terminals, for example, personal computers, cellular phones, portable game consoles, and electronic organizers, which are used while being connected to network has become more diverse, communication technology has also become more diverse. For example, in cellular phones, the technology which enables data to be transmitted and received between cellular phones in proximity to one another using infrared radiation, electric wave, and wireless LAN has become widely used in addition to wide range communications including regular telephone calls and emails.

In recent years, a technology of ad hoc communications which is responsible for transmission and reception of data between terminals with no base station involved has attracted attention. The ad hoc communication offers direct communication between the terminals when the terminals are located within the range of electrical wave reception, and relayed communication using another available terminals located in between the terminals as relay stations when the terminals are not within the range of electrical wave reception. In this manner, the communication between the terminals can be established without any base stations or wired networks; as a result, the communication can be established affordably and conveniently.

However, the constant search for the best reception route is required in the ad hoc communication in which the large area is covered, due to the fluctuations in the conditions of communication, for example, the movement of the terminal used as a rely station and the disconnection from a power source. For a successful implementation of recently proposed ubiquitous network with the ad hoc communication technology as a core, a number of business and security related concerns should be addressed. For this reason, the application of the ad hoc communication to large scale network is still on the development. Thus, in the technology currently in practical use, data communication through the ad hoc communication is limited between the terminals in proximity to each other.

Therefore, the data is required to be transmitted to a server through a base station for the data communication, for example, emailing, between terminals located far away from each other or emailing to a user not available. In that case, a user is bothered with a series of setups such as registering host email address in, for example, a vendor which manages the server and configuring software (e.g., a mailer) to adapt to the communication environment. The email address is composed of alphanumeric characters and more alphanumeric characters are required in order to have a unique mail address; as a result, numerous chances for human errors such as forgetting the address and entering an incorrect address are involved.

The present invention has been developed in this circumstance and its general purpose is to provide a technique which enables a simple and convenient communication for, for example, exchanging emails.

An aspect of the present invention relates to an electronic communication method. The electronic communication method comprises: allowing a first terminal and a second terminal to be connected through ad hoc communication in order for the first terminal to acquire the identification information of a user who manipulates the second terminal, and transmitting data to the second terminal from the first terminal through infrastructure communication by setting the identification information acquired during the ad hoc communication as a destination.

The term ad hoc communication is defined as direct communication between terminals without involving any relay base stations, and the term infrastructure communication is defined as communication between terminals in which base stations and servers are used as relay stations.

Another aspect of the present invention also relates to an electronic communication method. The electronic communication method is operative to transmit and receive data among a plurality of terminals, and comprises: generating user identification information comprising information to identify a user in the terminal who manipulates the terminal and information to identify the terminal; transmitting the user identification information to a server which mediates transmission and reception of the data from the terminal; storing the user identification information received in the server; and delivering data to the terminal based on the user identification information by the server.

The "data" may be any one data item that can be transmitted and received, for example, by commonly-used emails, such as character data including email texts and addresses, image data including pictures and objects such as characters and items included in the images which can be displayed on the terminal, audio data, archived data, and compressed data or any combinations of these described data items.

The electronic communication method may further comprise: transmitting the user identification information of a destination user of the data from a terminal which the destination user manipulates to a terminal originating the data through direct communication; transmitting, to the server, the data added with the user identification information of the destination user from the terminal originating the data; storing in the server the data received from the terminal originating data, in association with the user identification information of the destination user; identifying in the server the user identification information of a connection originating user who manipulates a terminal newly connected to the server; searching data stored in association with the user identification information of the destination user based on the user identification information of the connection originating user, and specifying data stored in association with user identification information which matches the user identification information of the connection originating user, in the server; and transmitting specified data to the newly connected terminal.

The term "direct communication" is defined as the direct transmission and reception of signals without connecting through any base stations or servers by, for example, wireless signal transmission means such as electric waves or through cables. The "ad hoc communication" may also be included in the direct communication.

Another aspect of the present invention relates to an electronic communication system. The electronic communication system comprises: a terminal operative to transmit and receive data; and a server operative to mediate data transmission and reception among the terminals through network, wherein the terminal comprises a user information management unit which generates user identification information comprising information to identify a user in the terminal who manipulates the terminal and information to identify the terminal, and a sending unit which connects to the server and transmits to the server the user identification information generated by the user identification management unit, and the server comprises a reception unit which receives the user identification information transmitted by the terminal, a data storing unit which stores the user identification information received by the reception unit, and a data delivery unit which delivers data to a terminal based on the user identification information stored in the data storing unit.

Another aspect of the present invention relates to a communication terminal. The communication terminal transmits and receives data directly between terminals or through a server, and comprises: a user information management unit operative to generate user identification information comprising information to identify a user in the communication terminal who manipulates the communication terminal and information to identify the communication terminal; an other user information acquisition unit operative to acquire the user identification information of a destination user of the data through direct communication with a communication terminal which the destination user manipulates; an sending unit operative to transmit, to the server, data added with user identification information of the destination user acquired by the other user information acquisition unit with connection; and a receiving unit operative to receive data, from the server while being connected to the server, in which the user identification information of the destination user matches the user identification information of a user who manipulates the host communication terminal.

Another aspect of the present invention relates to a server. The server mediates transmission and reception of data between terminals through network and comprises: a reception unit operative to receive user identification information comprising information to identify a user in the terminal who manipulates the terminal and information to identify the terminal, which are generated in the terminal; a data storing unit which stores the user identification information received by the reception unit; and a data delivery unit which delivers data to the terminal based on the user identification information stored in the data storing unit.

Optional combinations of the aforementioned constituting elements, and implementations of the invention in the form of methods, apparatuses, systems, recording mediums and computer programs may also be practiced as additional modes of the present invention.

The easy transmission and reception of, for example, emails can be achieved by the present invention.

BRIEF DESCRIPTION OF THE DRAWINGS

FIG. 3 is a diagram showing the data structure of a management number table stored in a user information storing unit;

FIG. 5 is a diagram showing the data structure of a destination ID table stored in a data storing unit;

20-terminal, 22-user information storing unit, 24-user information management unit, 26-data generation unit, 28-server connection unit, 30-sending unit, 32-receiving unit, 34-image processing unit, 35-display unit, 36-friend information storing unit, 38-terminal to terminal communication unit, 40-user information exchange unit, 42-data exchange unit, 50-server, 52-terminal connection unit, 54-reception unit, 56-connecting user information acquisition unit, 58-data transmission unit, 60-data storing unit, 62-destination determination unit, 64-data retrieving unit, 100-electronic communication system, 300-base station.

DETAILED DESCRIPTION OF THE INVENTION

Figure 1:
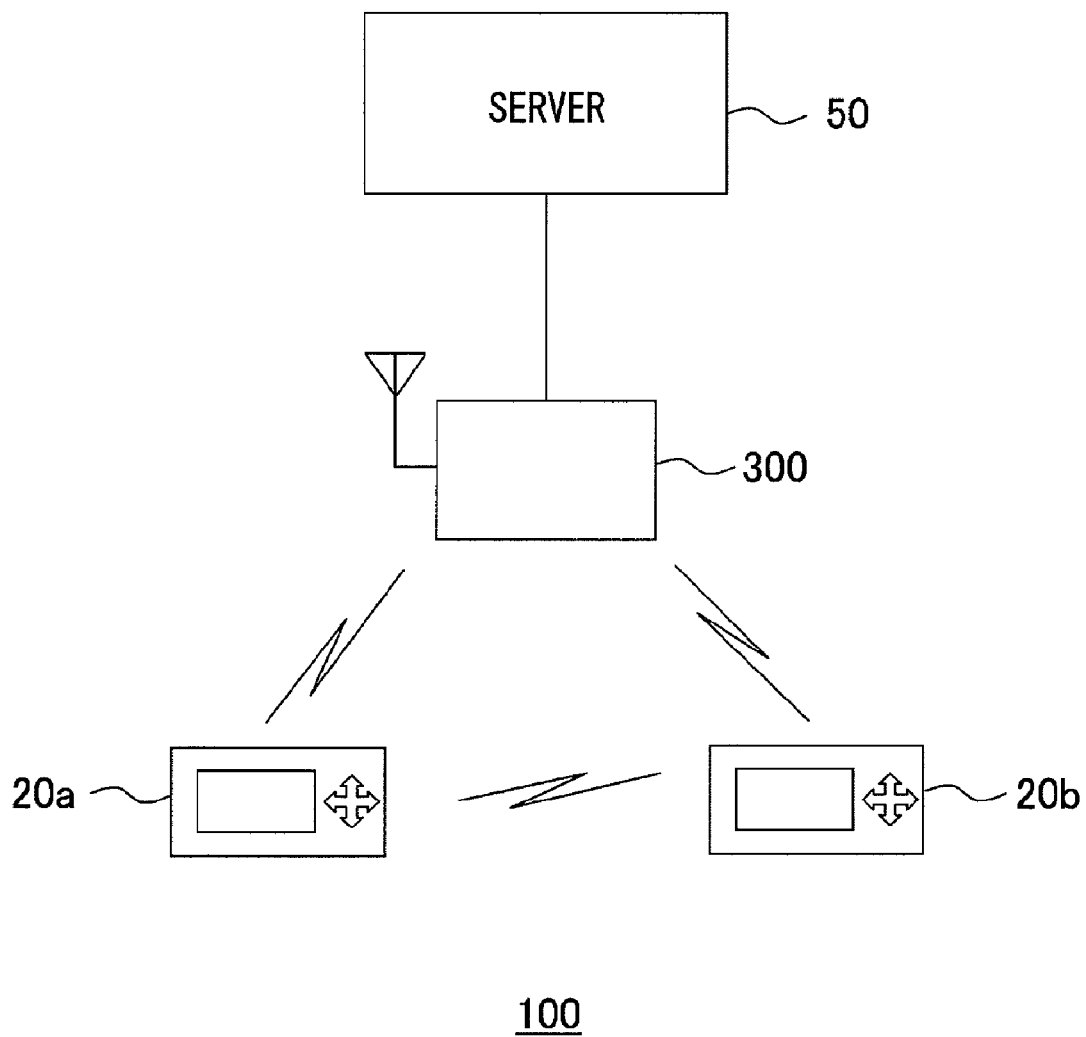
FIG. 1 is a view showing the whole configuration of electronic communication system according to the present embodiment.

FIG. 1 shows the whole configuration of electronic communication system according to the present embodiment. An electronic communication system 100 includes a plurality of terminals 20a and 20b, a server 50 which provides a service to the terminals 20a and 20b by transmitting and receiving data to and from the terminals 20a and 20b, and a base station 300 which relays a signal between the terminals, 20a and 20b, and the server 50. The number of the terminals is not limited to two; however, the terminals 20a and 20b are described in details in the following paragraphs. The terminals 20a and 20b communicate with the server 50 by transmitting and receiving signals to and from the base station 300 and the terminals also communicate directly to each other without the intervention of the base station 300. Hereinafter, the former is referred to as infrastructure communication and the latter is referred to as ad hoc communication. The terminal 20a communicates with the other terminal 20b and the base station 300 through a wireless signal transmission means such as electric waves and infrared radiation. A wired signal transmission and reception may be conducted by connecting cables to the terminals 20a and 20b. The commonly employed setup which is used for, for example, internet can be applied to the base station 300 and the server 50.

Figure 2:
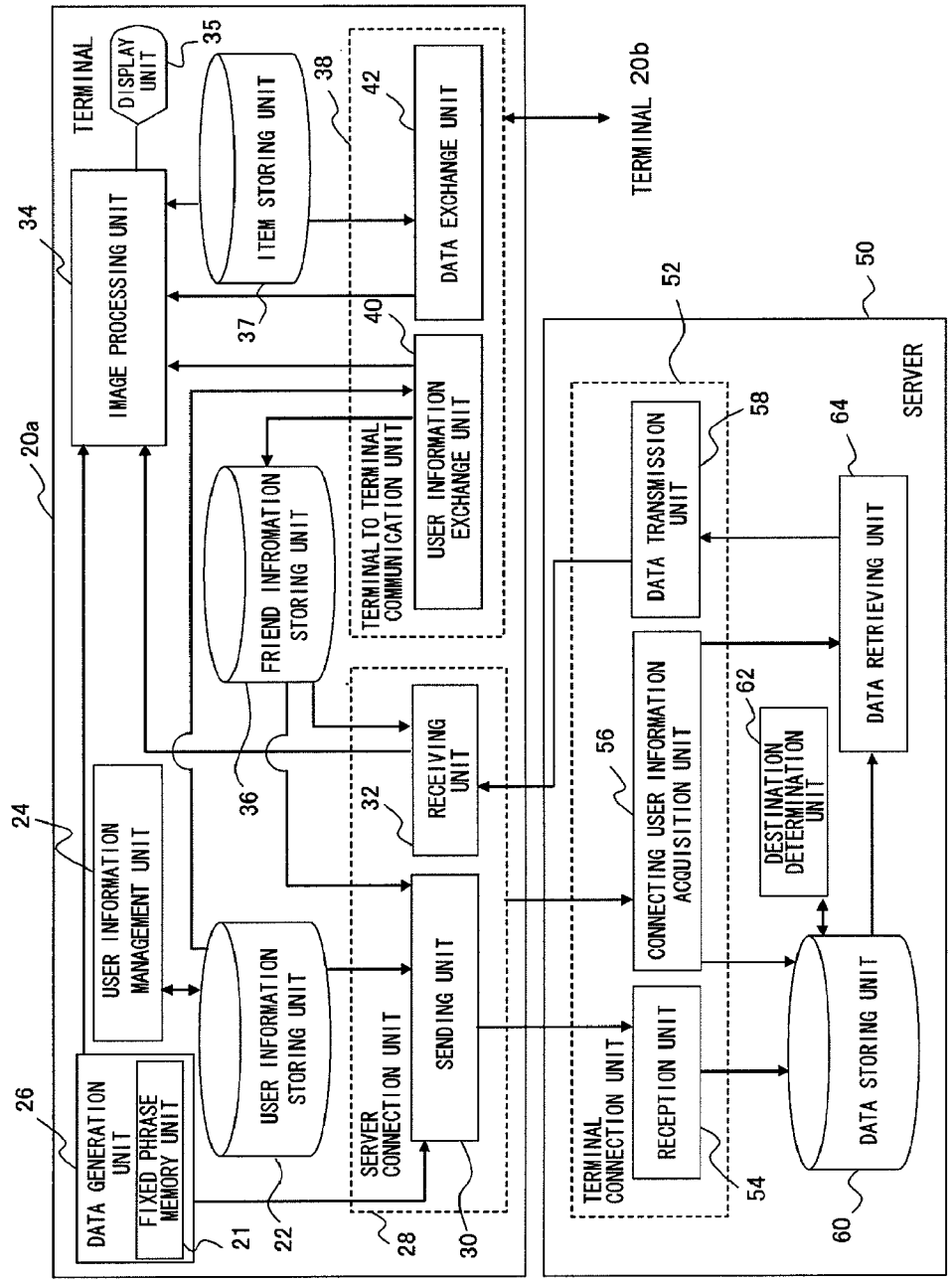
FIG. 2 is a diagram showing the configurations of a terminal and a server according to the present embodiment.

FIG. 2 shows the configurations of the terminal 20a and the server 50 according to the present embodiment. The communication between the terminal 20a and the server 50 is always mediated by the base station 300 as shown in FIG. 1; however, the explanation on the base station 300 is omitted in the figures and following description. The terminal 20a is provided with a user information management unit 24, a user information storing unit 22, a data generation unit 26, a server connection unit 28, an image processing unit 34, and a display unit 35. The user information management unit 24 manages information on a user who manipulates the terminal 20a, the user information storing unit 22 stores information on the user, the data generation unit 26 generates data for email or the like by, for example, a user's input instruction, the server connection unit 28 requests a connection to the server 50, builds data to be transmitted, and transmits and receives data, the image processing unit 34 generates information, which is required for the generation and the reception of emails, as image data, and the display unit 35 displays an image. The server connection unit 28 is provided with an sending unit 30 which generates a data set required for transmission and transmits the data set to the server 50, and an receiving unit 32 which receives the data set from the server 50 and processes the data set accordingly. The data generation unit 26 is provided with a fixed phrase storing unit 21 which stores a multiple selectable fixed phrases when a user writes an email.

The terminal 20*a* is also provided with a terminal to terminal communication unit 38 which connects the terminal 20*a* to the other terminal 20*b* through ad hoc communication and transmits and receives data, a friend information storing unit 36 which stores the information of the user who manipulates the other terminal 20*b*, the information being obtained through ad hoc communication, and an item storing unit 37 which stores image data of an item which is possibly displayed on the display unit 35 along with identification information. The terminal to terminal communication unit 38 is provided with a user information exchange unit 40 which exchanges the user information with the user who manipulates the other terminal 20*b* and processes the information as appropriate, a data exchange unit 42 which exchanges the information other than user information such as identification information of image data of an item to be displayed on the display unit 35 and processes the information as appropriate. All the terminals 20 including the other terminal 20*b* have the same configuration as the configuration of the terminal 20*a* described above.

On the other hand, the server 50 is provided with a terminal connection unit 52, a data storing unit 60, a data retrieving unit 64, and a destination determination unit 62, in which the terminal connection unit 52 establishes communication with the terminal 20, builds data for transmitting, and transmits and receives the data, the data storing unit 60 stores the received data for the respective originating user, the data retrieving unit 64 detects data to be transmitted to the terminal 20*a* from the data storing unit 60, and the destination determination unit 62 determines destination of destination unspecified data transmitted from the terminal 20*a* with an unspecified destination. A terminal connection unit 52 is provided with a reception unit 54 which receives a data set from the terminal 20*a*, a connecting user information acquisition unit 56 which identifies information of a user who manipulates the terminal 20 which is connected, when a communication with the terminal 20 is established, and a data transmission unit 58 which generates a data set required for transmitting and transmits the data set to the terminal 20*a*.

Each of the elements represented by functional blocks for performing various processes shown in FIG. 2 can be implemented by a CPU, a memory, an LSI or the like in terms of hardware, and by a memory-loaded program which receives an input instruction from a user and displays the input instruction as an image or the like in terms of software. Accordingly, it will be obvious to those skilled in the art that these functional blocks may be implemented in a variety of forms by hardware only, software only or a combination thereof, and the form is not limited to any of them.

FIG. 3 shows the data structure of a management number table which is a part of the user information stored in a user information storing unit 22 in the terminal 20*a*. A management number table 70 is a table which indicates identification information (i.e., management numbers) identifying a plurality of users who can operate a terminal 20*a*, and the table includes a user name column 72 and a management number column 74. In the user information storing unit 22, user information other than the management number table 70 may be stored; however, since this is outside the scope of the embodiment, the explanation is omitted.

A user information management unit 24 provides a user a unique management number, for example, when the user starts application software (referred to hereinafter as application) in which the embodiment can be realized for the first time in the terminal 20*a*. The management number can be determined uniquely by using time stamps indicating a process carried out by users at different times, for example, when a user initializes information necessary for the application or when a user saves progress information of a program for the first time.

The management number determined as described above is stored in the user information storing unit 22, by associating the number with a user name listed in the user name column 72 and listing the number in the management number column 74. The user name listed in the user name column 72 may be a preferred name set by a user, for example, during the initialization of the application; and as long as it is unique to each user, the user name can be determined by application details such as a login name or a character name displayed on the display unit 35.

Out of the management numbers for respective users managed in the management number table 70, one management number is selected according to, for example, a login name of the user who manipulates the terminal, in the ad hoc communication with the other terminal 20*b* or in the infrastructure communication with the server 50. As will hereinafter be described in detail, by adding a uniquely set identification number to the terminal 20*a*, a user ID which can identify each user in the server 50 and the other terminal 20*b* is generated.

Figure 4:
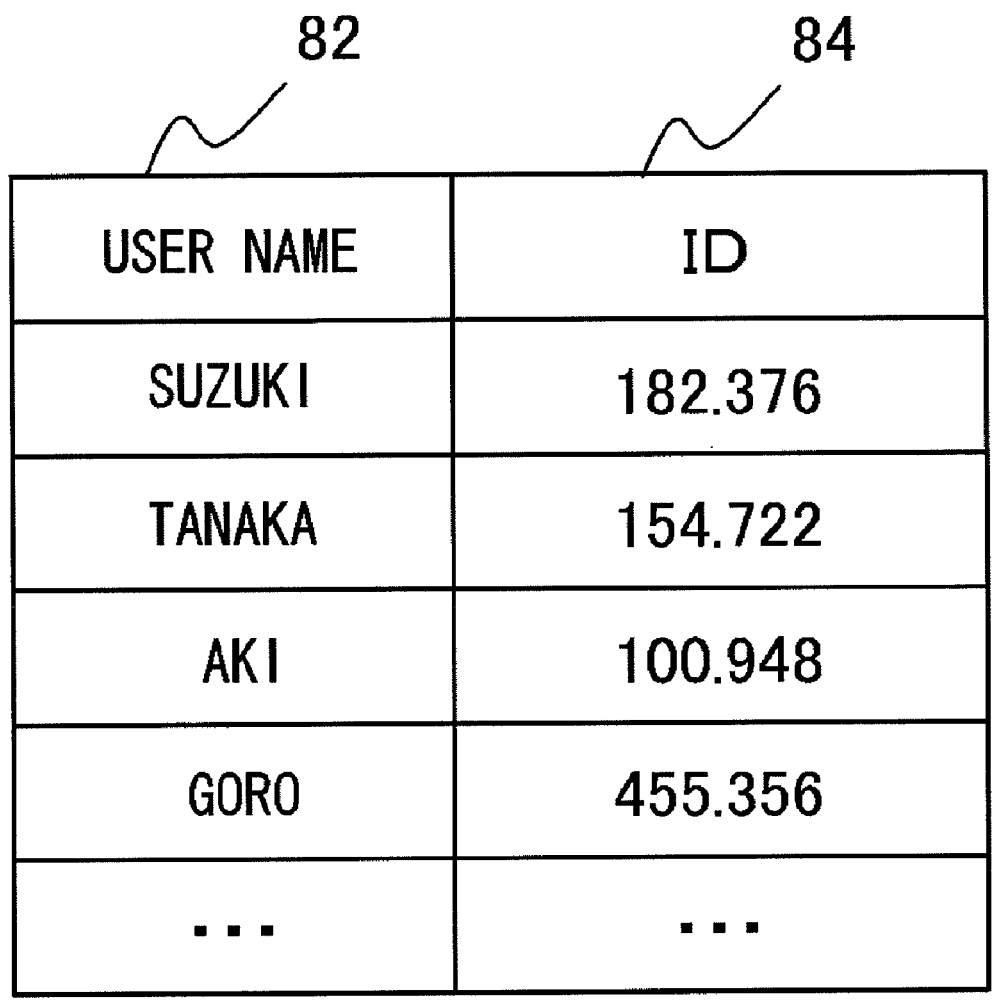
FIG. 4 is a diagram showing the data structure of a friend ID table stored in a friend information storing unit.

FIG. 4 shows a data structure of the friend ID table which is a part of the information on a user who operates the other terminal 20*b*, stored in the friend information storing unit 36. The friend ID table 80 is a table which lists the identification information or ID of the user who manipulates the other terminal 20*b* acquired through ad hoc communication in the past, more specifically, a table which lists ID and is provided with a user name column 82 and an ID column 84. In the friend information storing unit 36, information of the other user other than the friend ID table 80 may be stored; however, the explanation is omitted since this is outside the scope of the embodiment.

The user information exchange unit 40 searches, when the ad hoc communication with the other terminal 20*b* is established by the terminal to terminal communication unit 38 of the terminal 20*a*, the user information storing unit 22 by, for example, an input instruction by the user, and acquires the management number of the user. A data set formed by adding a user name of the aforementioned user to a user ID provided with the management number and the identification information of the terminal 20*a*, is then transmitted to the terminal 20*b*. A user can also be identified in nodes other than the terminal 20*a* according to a user ID which is provided with a management number for a respective user added with identification information of the terminal 20*a*.

A MAC (Media Access Control) address which is a physical address of the terminal 20*a* can be used as the identification information of the terminal 20*a*, for example. If the other user's ID is transmitted by the other terminal 20*b*, the user information exchange unit 40 receives the user ID, associates the ID with the user name of the other user, and lists the name and the ID in the user name column 82 and the ID column 84 of the friend ID table 80, respectively.

The ID listed in the ID column 84 of FIG. 4 has, for example, a format "182.376" in which the number "182" indicates the management number of a user in the terminal 20a and the number "376" indicates identification information of the terminal 20a. Thus, the user ID which corresponds to the respective user name in the management number table 70 stored in the terminal 20a shown in FIG. 3 is the management number listed in the management number column 74 added with the shared terminal identification information "376". However, the format for the ID is not limited to the format described above.

Every time the user ID of the other user is acquired through the ad hoc communication, the information exchange unit 40 adds the acquired information to the friend ID table 80. On the other hand, a user can delete the IDs of some users from the friend ID table 80 through an input instruction. As will hereinafter be described in detail, by avoiding a display of incoming data transmitted from a user not listed in the friend ID table 80, the terminal can practically have a function of rejecting incoming data.

To transmit the data such as emails from the terminal 20a to the other terminal 20b through the server 50, the originating user generates the data such as emails in the data generation unit 26 and selects the destination from the user names stored in the friend information storing unit 36.

The sending unit 30 in the terminal 20a first generates the user ID of the originating user according to the management number of the originating user stored in the user information storing unit 22 and the identification information of the terminal 20a. Then, the sending unit 30 transmits the data set to the reception unit 54 in the server 50, including data such as emails added with the user ID of the destination user selected by the originating user and the user ID of the originating user. The reception unit 54 stores the data set received in the data storing unit 60 for each user ID of destination user.

FIG. 5 shows the data structure of a destination ID table stored in the data storing unit 60, which associates the user ID of the destination user with a storage location of the data body. The destination ID table 90 is provided with a destination ID column 92 and a stored address column 94. For the respective user ID of the destination user included in the data set transmitted from, for example, the terminal 20a, a storage area in the data storing unit 60 is allocated in order to store the data body and the user ID of the originating user, and an initial address is listed in the stored address column 94. This storage area plays a role as a mailbox, the data received from, for example, the terminal 20a which originates data, and yet to be transmitted to, for example, the destination terminal 20b is stored in this storage area.

Also, even the data already transmitted to the destination terminal 20b may be stored in the same storage area until a certain capacity is reached or a certain period of time elapses. In that case, whether the data is transmitted or yet to be transmitted is specified by setting, for example, a flag for the transmitted data, which identifies that the data is already transmitted. When the reception unit 54 receives the data, the storage area is allocated to the user ID of a new destination user. Also, a storage area for the destination unspecified data only is saved in the data storing unit 60. The destination unspecified data is described in details hereinafter.

Below is the description of the steps in which data (e.g., data for emails) is transmitted through the infrastructure mode from the user manipulating the terminal 20a to the user manipulating the terminal 20b according to the above configuration. The data generated by the originating user in the terminal 20a is once transmitted to the server 50 and stored. When the destination user connects the terminal 20b to the server 50, the stored data is then transmitted to the terminal 20b.

Figure 6:
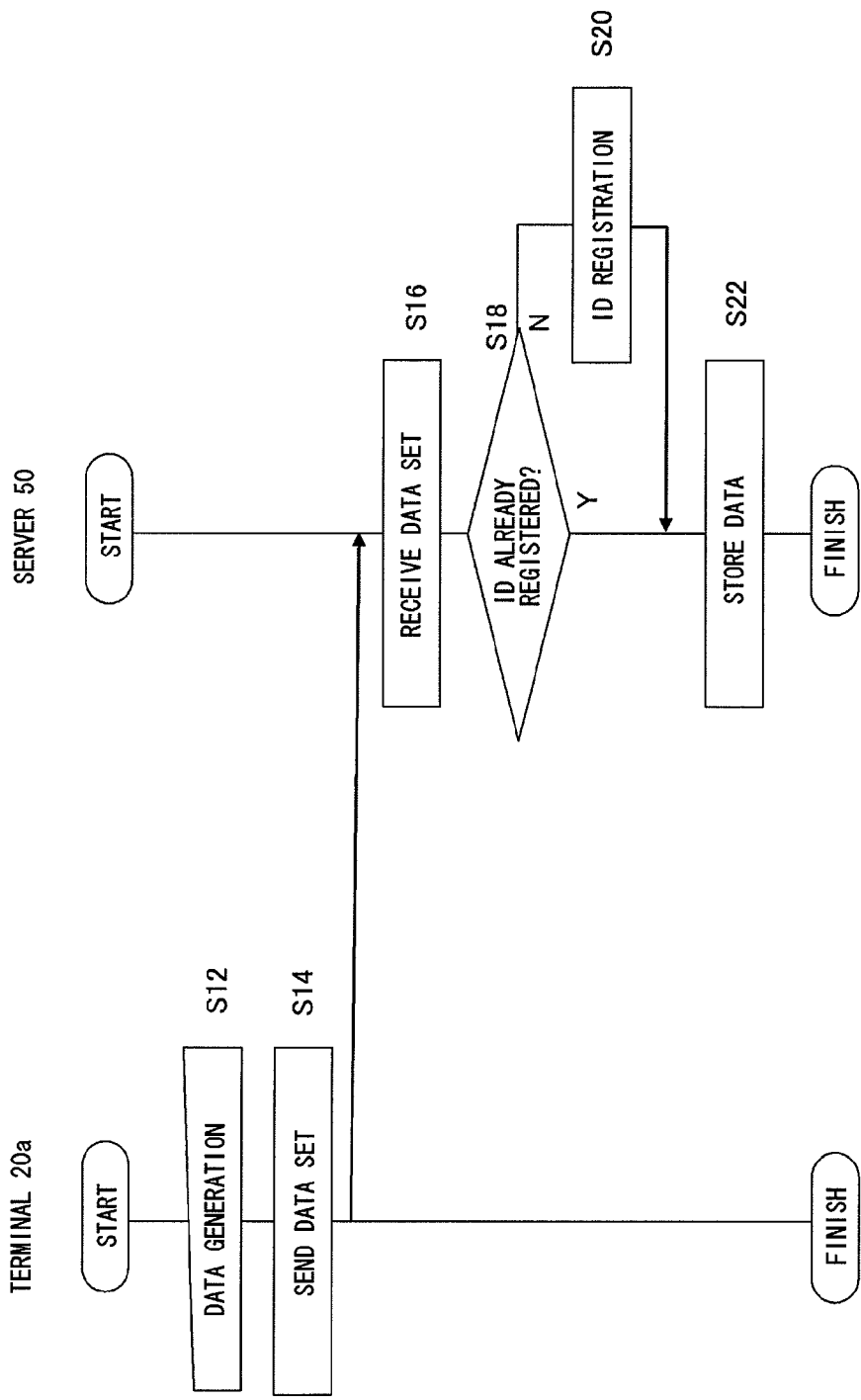
FIG. 6 is a flowchart showing the steps of data transmission to a server from a terminal.

FIG. 6 shows the steps in which the server 50 stores data from the terminal 20a. The originating user first inputs into the data generation unit 26 in the terminal 20a in order to generate data, for example, emails (S12). In this case, the image processing unit 34 allows display unit 35 to display the list of only the user names of the other users included in the information stored in the friend information storing unit 36, and the data generation unit 26 receives an input for selecting a destination. The sending unit 30 in the terminal 20a generates a data set which includes the data transmitted from the data generation unit 26 added with user IDs of the originating user and the destination user, and transmits the data set to the reception unit 54 in the server 50 (S14). Needless to say, this transmission of the data set is enabled with the establishment of the communication between the server connection unit 28 in the terminal 20a and the terminal connection unit 52 in the server 50.

When receiving the data set from the terminal 20a (S16), the reception unit 54 in the server 50 searches the destination ID table 90 in the data storing unit 60 based on the user ID of the destination user included in the data set, and determines whether the aforementioned user ID is already registered (S18). The term "registration" is defined as the allocation of the storage area for the data, which is addressed to the aforementioned user ID, to be stored; if there is a user ID in the destination ID column 92 in the destination ID table 90, it is determined that the ID is registered.

If the user ID of the destination user is already registered (Y in S18), the data, out of the data set received, is stored excluding the user ID of the destination user in the free space of the storage area of which initial address is the address of the data storing unit 60 listed in the stored address column 94 in the destination ID table 90 (S22). If the user ID of the destination user is not registered (N in S18), a new storage area in the data storing unit 60 is allocated to the user ID of the destination user, and the user ID and the initial address of the newly-allocated storage area are listed additionally. The data, out of the data set received, is then stored excluding the user ID of the destination user in the allocated storage area (S22).

Figure 7:
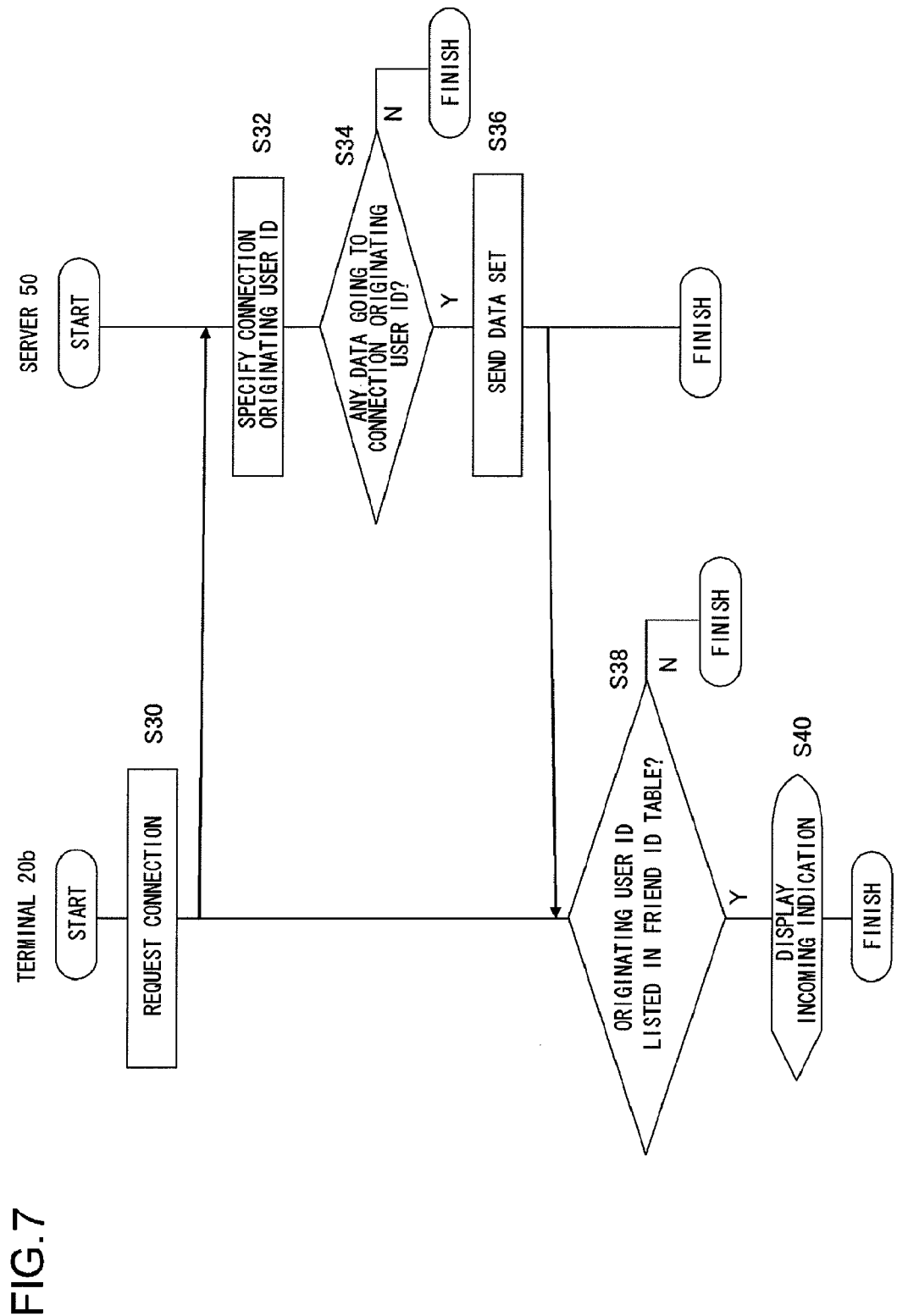
FIG. 7 is a flowchart showing the steps of data transmission to a terminal from a server.

FIG. 7 shows the steps performed in the terminal 20b from the reception of the data from the server 50 to the notification to the destination user. The server connection unit 28 in the terminal 20b first requests connection to the server 50 through, for example, the instruction input by the user (S30). The user may give a connection instruction to the server 50 either for the purpose of transmitting and receiving emails or for the purpose of getting another service provided by the server 50.

When the terminal connection unit 52 of the server 50 performs necessary procedures such as returning an answer signal to the terminal 20b, the connecting user information acquisition unit 56 identifies a connection originating user ID which is a user ID of the user manipulating the terminal 20b (S32). More specifically, a connection requesting signal from the terminal 20b may contain the connection originating user ID for acquisition by the server. Alternatively, the identification information of the terminal 20b may be acquired alone and separately in the middle of the connection procedure.

The data retrieving unit 64 specifies the storage area which corresponds to the connection originating user ID, by searching the destination ID table 90 in the data storing unit 60 based on the connection originating user ID acquired by connecting user information acquisition unit 60, and confirms if there is any unsent data in this storage area (S34). If there is no applicable data (N in S34), the process for the emails is finished and, for example, another service which the user desires is processed accordingly. If there is any unsent data with the connection originating user ID being its destination (Y in S34), the data transmission unit 58 transmits the data to the receiving unit 32 in the terminal 20b (S36). The data transmitted in this situation is a data set which includes the data body, such as emails, and the user ID of the originating user.

The receiving unit 32 in the terminal 20b, based on the user ID(s) of the originating user(s) included in one or more data set received in a communication session to the server 50, searches the friend ID table 80 in the friend information storing unit 36 and confirms if the originating user ID for each data set is listed in the ID column 84 (S38). The image processing unit 34 displays to indicate the reception of new data on the display unit 34 only if the data is from the originating user included in the friend ID table 80 (Y in S38, S40). Otherwise, the unit 34 does not display. After the user confirms the incoming indication, the data itself is displayed accordingly, depending on, for example, the details of the application to which the embodiment is applied; however, it is not mentioned here.

The transmission of data from the terminal 20a to the terminal 20b is completed by the steps described above. In the embodiment, since the data is transmitted and received based on the user ID generated automatically by the terminal side, it is not necessary for the user to obtain an email address beforehand as in the emailing using the widely used infrastructure communication, nor is it necessary for the server 50 side to allocate or manage an email address beforehand.

Also, the user need not be aware of the presence of the user ID since the host user ID is automatically generated and the user ID of the destination can be found out automatically by selecting the user name. Thus, a chance of the human errors such as forgetting the user's address or entering an incorrect address of the other user can be decreased and the email environment also becomes more available. Furthermore, since the processing of, for example, the production of the user ID, the exchange of the user IDs between the users, and the rejection of incoming data can be handled in the terminal side, the load of processing in the server is reduced.

The example of an application, to which the above-mentioned function for data transmission and reception is applied, is described in the following. The application which contains the above mentioned function is executed by loading the programs stored in storage devices such as a CD-ROM (Compact Disc Random Access Memory) and a hard disk, to implement the terminal 20a and server 50 functions, respectively.

Figure 8:
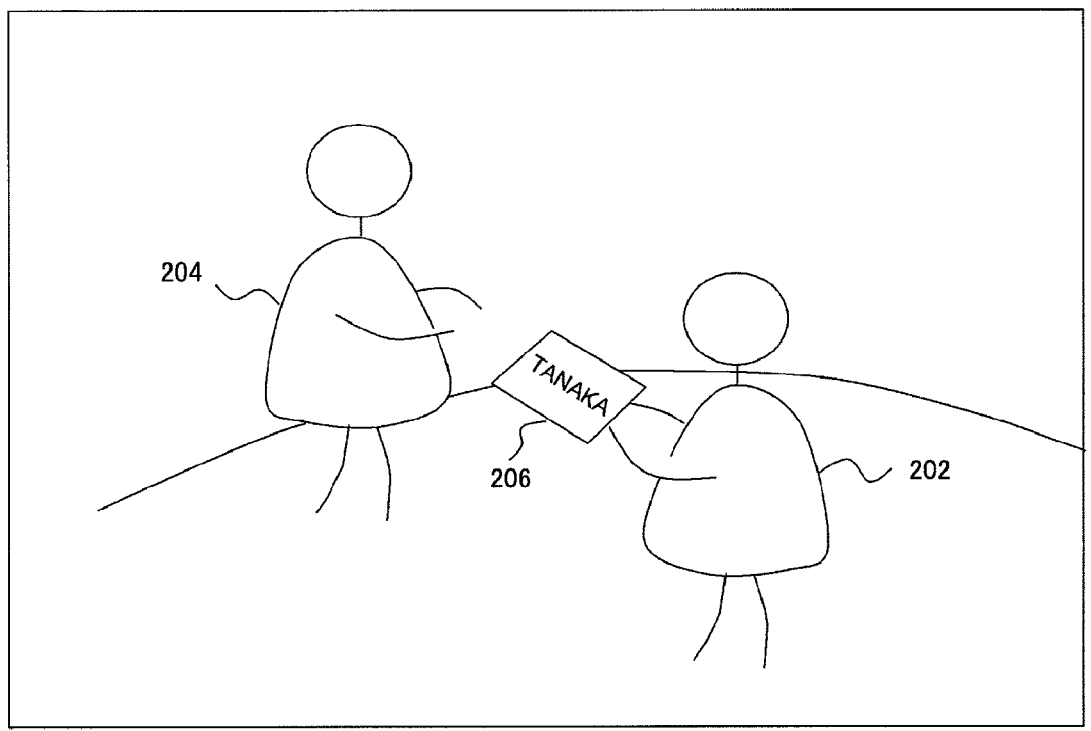
FIG. 8 is a diagram showing the image example displayed on two terminals in communication when the same application is running.

FIG. 8 shows an example of an image of the application to which the embodiment is applied. Such an image is displayed on the display unit 35 in cooperation of the user information exchange unit 40, the data exchange unit 42, the functional block which executes another function (not shown) of the application, and the image processing unit 34. In this application, the user appears as a character on the display unit 35 of the terminal 20a which the user manipulates. As a character walks and moves in various ways in accordance with the instruction input by the user, the corresponding function is achieved. With various items and characters expressed in the world of images, this application offers gameplay such as the character, which represents the user, acquiring and raising the items or the characters.

FIG. 8 is an example of the image displayed when the two terminals 20a and 20b, which are running the same application, establish the ad hoc communication. In an image example 200, two types of characters are displayed: the character representing the user who is manipulating the terminal 20a and the other user's character representing the user who is manipulating the other terminal 20b. The other user's character 202 appears on the display unit 35 of the terminal 20a when the ad hoc communication is established, and the same image appears on the display unit 35 of the other terminal 20b.

The movement of the other user's character 202 is also reflected in the image of the terminal 20a as a result of the information on the movement of the character, which is directed in the terminal 20b by the input of the other user, being sequentially received by the terminal 20a. With this, the movements of the characters, for example, talking and exchanging the items between the characters can be expressed and the communication between the users can be achieved, allowing the users to enjoy the game.

In the image example 200, a name card 206 in addition to the characters is displayed as an item. On the name card 206, a character name of the character in possession of the name card is described. The character name corresponds to the user name listed in the user name column 82 in the friend ID table 80. The user transmits and receives the user ID by making the user's character exchange the name card 206 in the world of images. In the example of FIG. 8, the other user's character 202 is handing a name card, in which one's character name "Tanaka" is described, to the host character 204.

Figure 9:
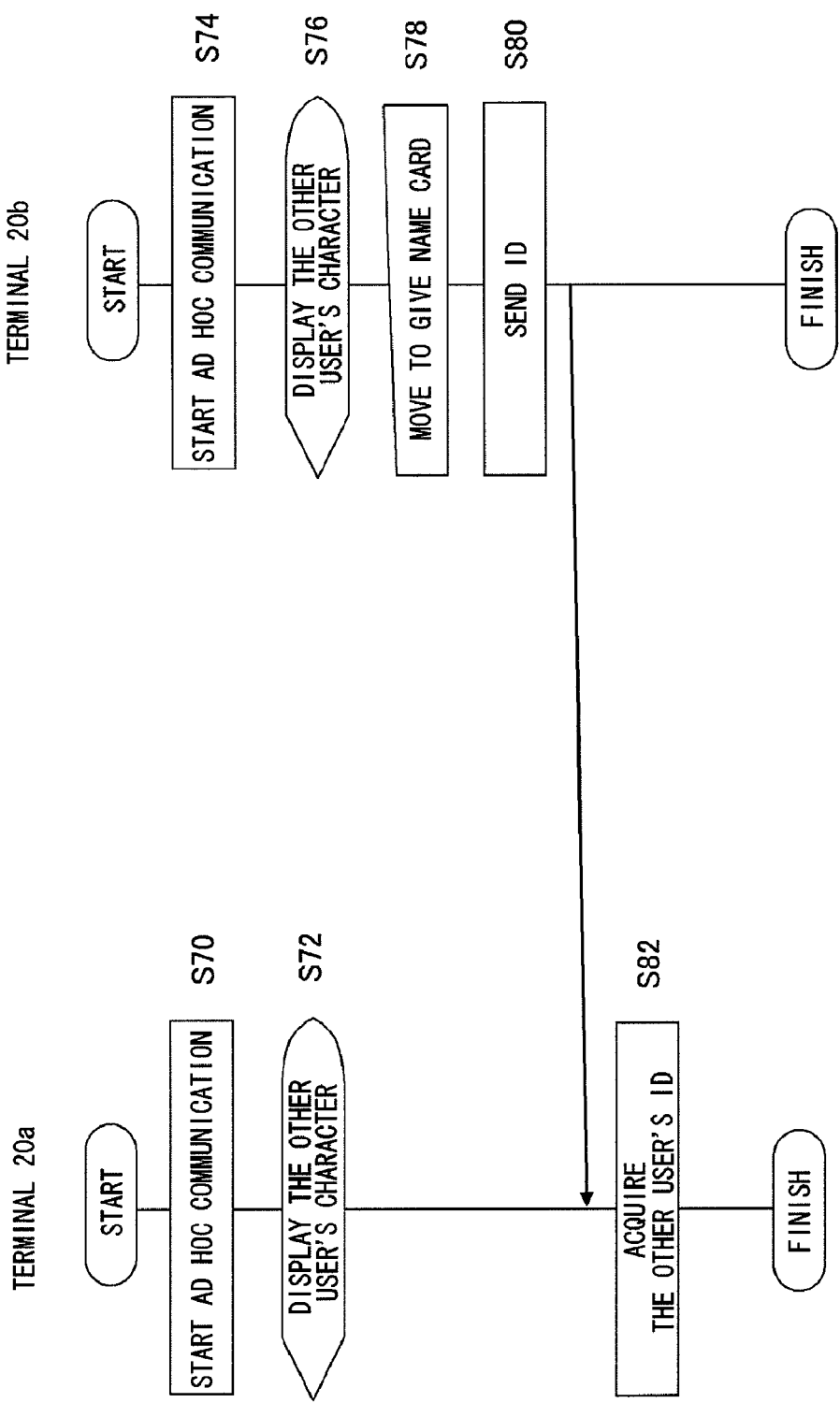
FIG. 9 is a flowchart showing the processing steps performed in each terminal under the condition in which the image example shown in FIG. 8 is displayed.

FIG. 9 shows the processing steps to be performed in each of the terminals 20a and 20b under the condition in which the image example 200 is displayed. First, having received the connection instruction by, for example, either of the terminals 20 or the non-illustrated third terminal 20, the terminal to terminal communication unit 38 in the terminals 20a and 20b establishes the ad hoc communication (S70, S74). This may be achieved by the user's input instruction which moves the host character 204 in the world of images to a town where a plurality of characters gathers as the result of input instruction.

When the ad hoc communication is established, the image processing unit 34 receives the information on the movement of the other user's character 202 input-instructed by the user who is manipulating the other terminal, and displays the other user's character 202 on the display unit 35 (S72, S76).

The other user who manipulates the terminal 20b gives the input instruction for the other user's character 202 which represents the aforementioned user to move to hand the name card to the host character 204 (S78). In this occasion, the name card with only the character name described is handed over as shown in the image example 200. On the other hand, the user information exchange unit 40 of the terminal 20b transmits the user name and the user ID of the other user who manipulates the terminal 20b to the user information exchange unit 40 of the terminal 20a (S80).

The user information exchange unit 40 of the terminal 20a writes the user name and the user ID in association with one another in the friend ID table 80 stored in the friend information storing unit 36 (S82). With this, the user ID of the other user who manipulates the terminal 20b is stored in the terminal 20a. For example, when the user who manipulates the terminal 20a selects a name card with a user name described from a name card holder in the world of images and attaches the name card to data such as an email the user writes, the user ID of the destination user is added to the data, and the transmission and reception of the data through the infrastructure mode is achieved as explained in FIGS. 6 and 7. In the same way, the host user ID may be transmitted from the user who manipulates the terminal 20a to the other user who manipulates the terminal 20b by handing over the name card from the host character 204 to the other user's character 202.

A new function in the application described above is described in the following which can be achieved by exchanging the item through the infrastructure communication by applying the means of data transmission and reception explained in FIGS. 6 and 7. This is a function of giving a gift to a stranger using the terminal 20 as if throwing a bottle into the ocean with a letter inside or flying a balloon with a letter attached. It is ensured that the exchanging of the items is realized by setting a system in which after the user sends a gift to a stranger, another gift arrives from a stranger. This function can be achieved by allowing the transmission of the data (i.e., destination unspecified data) in which the identification information indicating an unspecified destination is set in the field, included in the data set to be transmitted, where the user ID of the destination user is stored.

Figure 10:
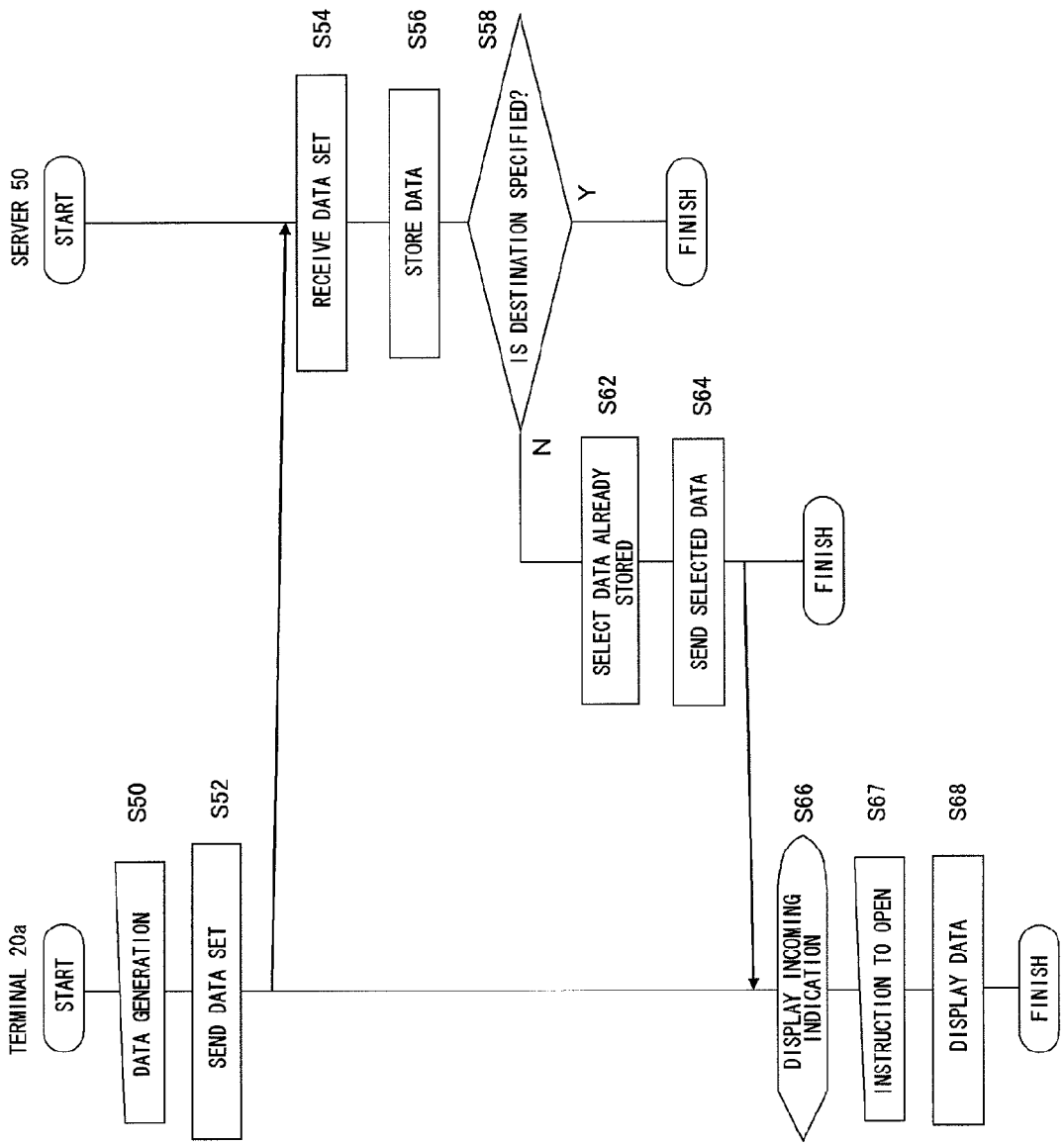
FIG. 10 is a flowchart showing the steps of transmitting and receiving data, including destination unspecified data, between a terminal and a server.

FIG. 10 shows the steps of data transmission and reception to and from the terminal 20*a* and the server 50 when the transmission of the destination unspecified data is enabled. Referring to this figure, the data, for which the user ID of the destination user is defined, is processed in the same way as illustrated in FIG. 6. Thus, as shown in S18 and S20 in FIG. 6, the registration of the user ID is confirmed as a matter of course, in the server 50; however, the illustration and the explanation are omitted.

The user first inputs to generate data, for example, emails into the data generation unit 26 as shown in FIG. 6 (S50). When the data with the unspecified destination needs to be created, the user selects, for example, a button to indicate that the destination is unspecified. In the emails included in the aforementioned data, only the sentences comprising fixed phrases stored in the fixed phrase storing unit 21 in the data generation unit 26 can be input. With this, the abuse of the function such as sending a squalid sentence to an unspecified user is prevented. The fixed phrases may be short sentences, for example, "Hello" and "Make the best of it".

When the user inputs for selecting an item acquired by the host character 204 which represents the user, the data generation unit 26 adds the identification information of the image data of the selected item to the transmission data. The identification information of the image data is the information which identifies the image data of each item stored in the item storing unit 37 of both terminals 20*a* and 20*b*. With the process described above, regardless of the destination being specified or unspecified, the data with the email and the item being a set is generated. In the transmission data, the image data itself of the item may be included.

The sending unit 30 in the terminal 20*a* generates a data set similar to the one in FIG. 6 and transmits the data set to the reception unit 54 in the server 50 (S52). The identification information, which indicates that the destination is unspecified, is set in the field for destination of the data for which the selection is input in S50 indicating a destination as unspecified. The resultant data is then transmitted. The identification information indicating the destination as unspecified uses the expression predetermined in common in the terminal 20*a* and the server 50, and it may be a number or character string, or the destination field may be left blank.

When receiving the data set from the terminal 20*a* (S54), the reception unit 54 of the server 50 stores, as in FIG. 6, data or the like in the storage area allocated respectively in the data storing unit 60 based on the user ID or the identification information described in the destination field (S56). If the identification information is set in the destination field, the data is stored in the storage area in the data storing unit 60 dedicated to address unspecified data.

If the identification information indicating that the destination is unspecified is set in the destination field (N in S58), the destination determination unit 62 then selects one data item such as the oldest data out of the destination unspecified data stored in the past in the storage area in the data storing unit 60 dedicated to address unspecified data, and determines the destination to be the user ID of the user of the terminal 20*a* which has transmitted the destination unspecified data at the time (S62). More specifically, the user ID of the originating host is acquired from the data set transmitted by the terminal 20*a*, and the selected destination unspecified data of the past is transferred to the storage area allocated to the aforementioned user ID.

The data transmission unit 58, as in S36 in FIG. 7, then transmits the destination unspecified data selected to the receiving unit 32 in the terminal 20*a* (S64). The data transmitted in this situation may not include the user ID of the originating user of the aforementioned data. When the receiving unit 32 receives the data, the data is not checked against the friend ID table 80, and the image processing unit 34 displays the incoming indication on the display unit 35 (S66).

Furthermore, when the user inputs the instruction to open the data received (S67), the image processing unit 34 searches the item storing unit 37 based on the identification information of the image data of the item included in the aforementioned data, acquires the image data of the item transmitted, and outputs the image data along with the email text to the display unit 35 (S68). With this, the user recognizes that a new item has been acquired. If the image data is already included in the data, the image data is output.

When the user ID of the destination user is designated in the destination field in S58 (Y in S58), the process is once completed at this point as described in FIG. 6. As explained in FIG. 7, the data stored in S56 is transmitted to, for example, the terminal 20*b* when the terminal 20*b*, which the aforementioned destination user uses, gets connected to the server 50.

With the steps explained above, the system which has a function with high entertainment value can be achieved in which, when the user sends the user's item to a stranger, another item is sent from somebody else. In this manner, the user is given the opportunity to, for example, receive a very rare item by chance. Since the transmission and reception of an item is achieved through the infrastructure communication, the function is effective especially for the user who does not have anybody around the user with whom the user can communicate through the ad hoc communication. Also, even though the object is limited to, for example, the item and the fixed phrase, extra entertainment to exchange something with a stranger can be found.

According to the embodiment described above, by realizing an application with a real time short distance communication and a time lagged long distance communication combined by using two communication modes, the ad hoc mode and the infrastructure mode, the terminal which provides satisfactory functionality and entertainment can be provided.

More specifically, since an email and an item can be transmitted to somebody far away by exchanging and attaching an item (e.g., a name card) without requiring the user to register or write an email address, the user intervention in the communication process is limited and human errors are minimized. Thus, those who are not used to using the alphanumeric characters, for example, children and the elderly can transmit and receive data easily.

Also, the user ID is automatically generated in the terminal and automatically registered in the server concurrently with the data transmission. Furthermore, the function including the rejection of incoming data is processed in the terminal. For this reason, the number of matters to be managed and processed in the server is decreased and the load of the vendor providing the service is reduced, resulting in the reduction in cost for the operation. Also, since an item can be given to a stranger through the infrastructure communication, the likelihood of collecting items by chance is increased and the user can find high entertainment value as a result.

Described above is an explanation of the present invention based on the embodiments. The above embodiments are intended to be illustrative only and it will be obvious to those skilled in the art that various modifications to constituting elements and processes could be developed and that such modifications are also within the scope of the present invention.

For example, in S18 in FIG. 6, it is confirmed whether the user ID of the destination user included in the data set transmitted from the terminal 20a to the server 50 has been already registered in the destination ID table 90; however, whenever the terminal 20a or the terminal 20b get connected to the server 50, the same confirmation process may be performed for the connection originating user ID. More specifically, in S14 or S54 in FIG. 6 or 10, respectively, when the terminal 20a transmits the data set or before that which is when the terminal 20a gets connected to the server 50, the connecting user information acquisition unit 56 in the server 50 identifies the connection originating user ID which is the user ID of the user who manipulates the terminal 20a as described above. It is then confirmed whether the aforementioned connection originating user ID has been registered in the destination ID table 90, and if not registered, the same registration process as S20 in FIG. 6 is performed.

Similarly, in S32 in FIG. 7, the identification of the connection originating user ID of the terminal 20b by the connecting user information acquisition unit 56 may be followed by the process of confirming whether the ID has been registered in the address ID table 90. In that case, the user ID can be registered previous to the email transmission by each terminal, and the load of processing in the server 50 during email transmission and reception can be reduced.

Also, the item may not be attached to the data with unspecified destination. In that case, only the fixed phrase is sent to a stranger. The destination unspecified email with no item attached may be stored in the data storing unit 60 in the server 50 mixed with the destination unspecified email with the item attached, or distinctive storage areas may be provided according to the presence of the item attached. In the latter case, the email with the item attached can be sent to the user who sent the destination unspecified email with the item attached in return and the email without the item attached can be sent to the user who sent the email without the item attached.

Also, a plurality of items may be attached to one data item. In that case, by preparing the data storage area in the data storing unit 60 for the respective number of the items attached, for example, the data with three items attached can be transmitted in return to the user who transmitted the data with three items attached.

Furthermore, the types of items may be ranked according to the frequency of appearance, so that storage areas may be distinguished from each other according to the rank and the number of items attached to an email with an unspecified destination. In that case, the user is given an opportunity to acquire a variety of the items; for example, the user who sent an email with a plurality of the items of high appearance ratio attached can receive the email with the item of the same value as the total value of the attached items, for example, an item of the low appearance ratio. In this variation example, the same effects as those obtained in the embodiment can also be obtained.

Also, during the ad hoc communication of the terminals 20a and 20b, the data exchange unit 42 in the respective terminals may exchange an item different from the name card 206 shown in FIG. 8. In this case, as the name card 206 is given and received, the item may be given and received by the input for selecting the item which the user who manipulates each terminal desires to send. Alternatively, the item selected by the data exchange unit 42 (i.e., propagation item) may be given automatically to the other user independently of the input instruction by the user.

The image processing unit 34 starts, when the information on the image data of the propagation item is transmitted from the terminal of the other user, displaying the propagation item on the image display unit 35 based on the aforementioned information on the image data, and stops when the information on the image data of the propagation item is transmitted from the host terminal to the terminal of the other user, displaying the propagation item on the image display unit 35. With this, the user visually perceives as if the propagation item were automatically propagated between the terminals by the established communication.

If a plurality of the terminals is connected through the ad hoc communication simultaneously, the selected item may be given only to the user randomly selected by the data exchange unit 42 out of all the users of the terminals in communication. As in the case of the email with an attached item described with reference to FIG. 10, the data transmitted to the terminal of the other user in delivering the item may be the identification information identifying image data or the image data itself. As a result of this fortuity, the user is given the opportunity to acquire the item the user wanted unexpectedly, and the communication with other user become more enjoyable.

As described above, the present invention can be applied to electronic devices such as a game device, a cellular phone, and a computer.

What is claimed is:

1. An electronic communication method operative to transmit and receive data among a plurality of terminals, comprising:
   generating, in each terminal, user identification information comprising information to identify a user in the terminal who manipulates the terminal and information to identify the terminal;
   receiving, in one of the plurality of terminals manipulated by a user, a signal indicating the user identification information of another user directly transmitted from another terminal that the other user manipulates without mediation of a server;
   transmitting data directed to the other user with the user identification information of the other user as a destination user to a server which mediates transmission and reception of the data from the one terminal;
   storing the data received from the one terminal originating the data, in association with the user identification information of destination user in the server;
   identifying, in the server, the user identification information of a connection originating user who manipulates a terminal newly connected to the server;
   searching data stored in association with the user identification information of the destination user based on the user identification information of the connection originating user, and specifying data stored in association with the user identification information which matches the user identification information of the connection originating user, in the server; and
   transmitting specified data to the newly connected terminal.

2. An electronic communication system, comprising:
a terminal manipulated by a user operative to transmit and receive data; and
a server operative to mediate data transmission and reception between the terminal and other terminals through a network, wherein
the terminal comprises a user information management unit which generates user identification information comprising information to identify a user in the terminal who manipulates the terminal and information to identify the terminal, an other user information acquisition unit operative to receive a signal indicating the user identification information of another user directly transmitted from another terminal which the other user manipulates without mediation of a server, and a sending unit which connects to the server and transmits data directed to the other user with the user identification information of the other user as a destination user to the server, and
the server comprises a reception unit which receives the data with the user identification information of the destination user transmitted by the terminal originating the data, a data storing unit which stores the data received by the reception unit in association with the user identification information of the destination user received by the reception unit, and a data delivery unit comprising a connecting user information acquisition unit which identifies user identification information of a connection originating user who manipulates a terminal newly connected to the server, a data retrieving unit which searches the data storing unit based on the user identification information of the connection originating user identified by the connecting user information acquisition unit and specifies data stored in association with the user identification information which matches the user identification information of the connection originating user, and a data transmission unit which transmits data specified by the data retrieving unit to the newly connected terminal.

3. A communication terminal which is manipulated by a user and transmits and receives data directly between other terminals or through a server, comprising:
a user information management unit operative to generate user identification information comprising information to identify a user in the communication terminal who manipulates the communication terminal and information to identify the communication terminal;
an other user information acquisition unit operative to receive a signal indicating the user identification information of another user directly transmitted from another communication terminal which the other user manipulates without mediation of a server;
a sending unit operative to connect to the server and transmit, to the server, data directed to the other user with the user identification information of the other user as a destination user, the user identification information being acquired by the other user information acquisition unit; and
a receiving unit operative to receive data, from the server while being connected to the server, in which the user identification information of the destination user matches the user identification information of a user who manipulates a host communication terminal.

4. The communication terminal according to claim 3, further comprising:
an image display unit operative to display an image which contains an object, wherein
the other user information acquisition unit is operative to receive the signal indicating the user identification information of the other user while displaying on the image displaying unit the movement of an object which represents the user identification information of the other user coming from the other communication terminal which the other user manipulates.

5. The communication terminal according to claim 4 wherein a propagation object is visually perceived by the user as if the object were automatically propagated between terminals in the established communication, comprising:
an item delivering unit operative to select any one of objects displayed on the image display unit as a propagation object and transmit, independently from instruction input from a user, information on the image data of the propagation object to a communication terminal which the destination user manipulates, when the direct communication with the communication terminal which the destination user manipulates is established; and
an image processing unit operative to start displaying the propagation object on the image display unit based on the information on the image data when the information on the image data of the propagation object is transmitted from the item delivering unit of a communication terminal which the destination user manipulates, and stop displaying the propagation object on the image display unit when the information on the image data of the propagation object is transmitted from the item delivering unit of a host communication terminal to a communication terminal which the destination user manipulates.

6. The communication terminal according to claim 3, wherein
the other user information acquisition unit is operative to acquire a user name of the other user along with the user identification information of the other user,
the terminal further comprises a friend information storing unit which stores the user identification information of a plurality of other users and the user name in association with one another, and
the sending unit is operative to transmit, to the server, data with the user identification information which is stored in the friend information storing unit in association with the user name selected by the originating user.

7. The communication terminal according to claim 3, further comprising:
an other user information storing unit operative to store an other user information table listing user identification information of a user originating data which is allowed to be displayed when it is received; wherein
the sending unit is operative to transmit data to the server further added with user identification information of an originating user who manipulates the host communication terminal, and
the receiving unit is operative to search the other user information table based on user identification information of the originating user added to data received from the server and display the incoming indication when user identification information of the originating user is listed in the other user information table.

8. The communication terminal according to claim 3, wherein
the sending unit is operative to further transmit, to the server, destination unspecified data in which identification information indicating a destination as unspecified is set instead of the user identification information of the destination user, and the receiving unit is operative to further receive from the server any one destination unspecified data item previously transmitted and stored in the server.

9. A server which mediates transmission and reception of data between terminals manipulated by respective users through network, comprising:
- a reception unit operative to receive data added with user identification information of a destination user of the data from a terminal originating the data, the user identification information comprising information to identify a user in the terminal who manipulates the terminal and information to identify the terminal, which are generated in the terminal;
- a data storing unit which stores the data received by the reception unit in association with the user identification information of the destination user; and
- a data delivery unit comprising a connecting user information acquisition unit which identifies the user identification information of a connection originating user who manipulates a terminal newly connected to the server, a data retrieving unit which searches the data storing unit based on the user identification information of the connection originating user identified by the connecting user information acquisition unit and specifies data stored in association with user identification information which matches the user identification information of the connection originating user, and a data transmission unit which transmits data specified by the data retrieving unit to the newly connected terminal.

10. The server according to claim 9, wherein
the reception unit is operative to further receive destination unspecified data in which identification information indicating a destination as unspecified is set instead of the user identification information of the destination user from a terminal originating the data,
the data storing unit is operative to further store the destination unspecified data received by the reception unit in a predetermined storage area, and the data transmission unit is operative to transmit any one destination unspecified data item stored previously in the predetermined storage area when the destination unspecified data is newly received by the reception unit, to a terminal originating the new destination unspecified data.

11. A computer program product executed by a computer provided in a communication terminal manipulated by a user operative to transmit and receive data between terminals or via a server, the program product comprising:
- a module which generates user identification information comprising information to identify a user in the communication terminal who manipulates the communication terminal and information to identify the communication terminal;
- a module which receives a signal indicating a user identification information of another user directly transmitted from another communication terminal which the other user manipulates without mediation of a server;
- a module which transmits, to the server, data directed to the other user with the user identification information of the other user as a destination user; and
- a module which receives data, from the server while being connected to the server, in which the user identification information of the destination user matches the user identification information of a user who manipulates a host communication terminal.

12. The computer program product according to claim 11 executed by the computer, the program product further comprising:
- a module which stores an other user information table listing user identification information of a user originating data which is allowed to be displayed when it is received;
- a module which further adds user identification information of an originating user who manipulates a host terminal when the data is transmitted to the server; and
- a module which searches the other user information table based on user identification information of the originating user added to data received from the server and displays the incoming indication when user identification information of the originating user is listed in the other user information table.

13. The computer program product according to claim 11 executed by the computer wherein the propagation object is visually perceived by the user as if the object were automatically propagated between terminals in the established, the program product further comprising:
- a module which displays an image which contains an object;
- a module which selects any one of displayed objects as a propagation object and transmits, independently from instruction input from a user, information on the image data of the propagation object to a communication terminal which the destination user manipulates, when the direct communication with the communication terminal which the destination user manipulates is established;
- a module which starts the display of the propagation object based on the information on the image data when the information on the image data of the propagation object is transmitted from a communication terminal which the destination user manipulates; and
- a module which stops the display of the propagation object when the information on the image data of the propagation object is transmitted from the host communication terminal to the communication terminal which the destination user manipulates.

14. A computer program product adapted to a computer installed in a server operative to mediate transmission and reception of data between terminals manipulated by respective users through network, the program product comprising:
- a module which receives the data added with user identification information of a destination user which comprises information to identify, in the terminal, the destination user of the data who manipulates the terminal, and information to identify the terminal manipulated by the destination user, from the terminal originating the data;
- a module which stores the received data in association with the user identification information of the destination user;
- a module which identifies the user identification information of a connection originating user who manipulates a terminal newly connected to the server;
- a module which searches data stored in association with the user identification information based on the user identification information of the identified connection originating user and specifies data stored in association with user identification information which matches the user identification information of the connection originating user; and
- a module which transmits specified data to the newly connected terminal.

15. The computer program product according to claim 14 adapted to the computer, the program product comprising:
- a module which receives destination unspecified data in which identification information indicating a destination as unspecified is set instead of the user identification information of the destination user from a terminal originating the data;

a module which stores the received destination unspecified data in predetermined storage area; and a module which transmits any one destination unspecified data item stored previously in the predetermined storage area when the destination unspecified data is newly received, to a terminal originating the new destination unspecified data.

16. A computer-readable recording medium having embodied thereon the computer program product according to claim 11.

* * * * *